United States Patent Office 3,139,449
Patented June 30, 1964

3,139,449
PROCESS FOR PREPARING ORGANIC ISOTHIO-
CYANATE USING PHOSPHORUS - CONTAIN-
ING CATALYSTS
Leo Ahramjian, Wilmington, Del., assignor to E. I. du
Pont de Nemours and Company, Wilmington, Del., a
corporation of Delaware
No Drawing. Filed Feb. 7, 1961, Ser. No. 87,522
9 Claims. (Cl. 260—454)

This invention relates to a process for preparing organic isothiocyanates and more particularly to a process for preparing organic isothiocyanates from organic isocyanates and carbon disulfide in the presence of phosphorus-containing catalysts.

Recently organic isocyanates have become of considerable importance commercially because of their valuable properties. The isothiocyanates undergo many of the reactions of the corresponding isocyanates and have the advantage that, for certain applications, they are less reactive and may be used with fewer precautions.

It is known to prepare organic aryl diisothiocyanates by reacting an aryl diisocyanate with specified proportions of phosphorus pentasulfide. While this provides a more feasible method for the preparation of aryl diisothiocyanates than was heretofore available, this method is expensive. There is, therefore, still a need for more economically attractive methods for the preparation of organic isothiocyanates.

It is an object of the present invention to provide a novel process for the preparation of organic isothiocyanates. A further object is to provide a process for preparing these isothiocyanates from organic isocyanates and carbon disulfide in the presence of catalytic amounts of certain phosphorus-containing compounds. Other objects will appear hereinafter.

These and other objects of this invention are accomplished by the process of preparing organic isothiocyanates by heating an organic isocyanate with at least one molecule of carbon disulfide for each isocyanato group at a temperature of from about 100 to 400° C. in the presence of a catalytic amount of a phosphorus-containing compound selected from the group consisting of a substituted phospholine having the formula

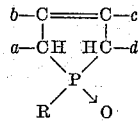

a substituted phospholidine having the formula

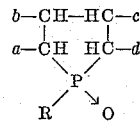

and a phosphonate ester having the formula

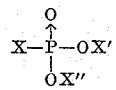

wherein $a$, $b$, $c$ and $d$, each independently, represent a radical selected from the group consisting of hydrogen, halogen, lower alkyl, lower alkenyl, phenyl, cyclohexyl radicals, or polymethylene groups which, together with two adjacent carbon atoms in the heterocyclic ring, form a cycloaliphatic ring; R is a radical selected from the group consisting of lower alkyl and a phenyl radical; and X, X' and X" are radicals containing from one to 12 carbon atoms selected from the group consisting of alkyl, alkenyl and halogen-substituted alkyl radicals.

In carrying out the process of this invention any organic isocyanate, including monoisocyanates and polyisocyanates, may be used, such as aromatic, aliphatic, and cycloaliphatic types. These organic isocyanates may contain other substituents provided the substituents are not reactive with the isocyanato group or groups. Such nonreactive substituents are those which do not contain active hydrogen, as indicated by the Zerewitinoff test. They include halogen radicals, ether and thioether radicals, nitro groups, carbalkoxy groups, etc.

Aliphatic isocyanates which may be used include those in which the aliphatic radical is branched or unbranched. The aliphatic radical may also contain one or more carbon-to-carbon double bonds. Representative examples of aliphatic monoisocyanates that may be used are methyl isocyanate, ethyl isocyanate, n-butyl isocyanate, isobutyl isocyanate, octyl isocyanate, octadecyl isocyanate, allyl isocyanate, vinyl isocyanate, amyl isocyanate, and 2-ethoxyethyl isocyanate. Aliphatic diisocyanates that may be used include tetramethylene diisocyanate, hexamethylene diisocyanate, and decamethylene diisocyanate.

Suitable aromatic or cycloaliphatic isocyanates may be either mononuclear or polynuclear. Examples of monoisocyanates are phenyl isocyanate, m-tolyl isocyanate, p-tolyl isocyanate, o-tolyl isocyanate, 1-naphthyl isocyanate, 2-naphthyl isocyanate, o-nitrophenyl isocyanate, 4-biphenylyl isocyanate, 4-chlorophenyl isocyanate, 2-methoxyphenyl isocyanate, 3-methoxyphenyl isocyanate, cyclohexyl isocyanate, and decahydronaphthyl isocyanate. Examples of diisocyanates are 2,4-tolylene diisocyanate, 2,6-tolylene diisocyanate, m-phenylene diisocyanate, p-phenylene diisocyanate, 4-chloro-1,3-phenylene diisocyanate, 4,4'-biphenylene diisocyanate, 4,4' - methylene-bis-(phenyl isocyanate), 1,5-naphthylene diisocyanate, and 3,3'-dimethoxy-4,4'-biphenylene diisocyanate.

Examples of compounds containing more than two free isocyanato groups which may be used include 2,4,6-triisocyanato toluene, p-isocyanatophenyl 2,4-diisocyanatophenyl ether, and isocyanate trimers, such as are disclosed in U.S. Patent 2,801,244.

In addition to the above mentioned organic isocyanate compounds, it is also to be understood that isocyanate-terminated polymers may be used in the process of the present invention so as to prepare the corresponding isothiocyanate-terminated polymers. Representative isocyanate-terminated polymers which may be used include the reaction products of a polymer having terminal hydroxyl, amino or carboxyl groups with a molar excess of an organic diisocyanate. Thus, for example, a glycol such as polyalkleneether glycol or a polyester glycol, may be reacted with a molar excess of an organic diisocyanate so as to provide an isocyanate-terminated polyurethane polymer.

In carrying out the process of the present invention, the organic isocyanate is reacted with an amount of carbon disulfide sufficient to provide at least one molecule of carbon disulfide for each free isocyanato (—NCO) group. Less than about one molecule of carbon disulfide will afford an insufficient amount of carbon disulfide to react with all of the isocyanato groups. It has been determined that better yields of the organic isothiocyanates are obtained if an excess of carbon disulfide is used. Up to 10 molecules of carbon disulfide per molecule of isocyanato group may be used advantageously. More than this amount is uneconomical. It is preferred to use sufficient carbon disulfide to provide 1.5 to 8.5 molecules per molecule of isocyanato group.

The reaction should be carried out in a closed system as, for example, in a steel autoclave, at a temperature of about 100° C. to about 400° C. Below 100° C. the reaction proceeds at too slow a rate to be practical, and at temperatures greater than 400° C. decomposition of the product results. The preferred temperature range is 200° C. to 300° C. The reaction time is dependent on temperature of the reaction. Lower temperatures require longer reaction times. At 300° C., one to two hours should be sufficient. At 250° C., two to four hours should suffice. At 200° C., twelve to eighteen hours, and at 150° C., eighteen to twenty-four hours are required. At 100° C., a reaction time of twenty-four to forty-eight hours are needed to produce a satisfactory yield. Below this temperature, the reaction proceeds at too slow a rate to be practical. The organic isothiocyanate may be isolated by conventional methods as, for example, by evaporation of excess carbon disulfide followed by fractional distillation.

The process of the present invention involves the reaction of the above mentioned organic isocyanates with the required amount of carbon disulfide in the presence of catalytic amounts of phosphorus-containing compounds. The catalyst should be used in amounts ranging from 0.01 to 10.0 parts by weight per 100 parts by weight of the isocyanate compound. Less than 0.01 part gives insufficient catalytic effect and more than 10 parts is not required and is uneconomical. The preferred amount is about 0.02 part to about 2 parts per 100 parts of isocyanate compound.

The phospholines which are useful as catalysts in the process of the present invention are compounds having the formula

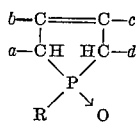

wherein $a$, $b$, $c$, $d$ and R have the significance defined above. It is to be understood that the R phenyl radicals may contain inert substituents such as alkyl or halogen radicals. Representative examples of 3-phospholine-1-oxides that may be used include 1-phenyl-3-phospholine-1-oxide, 3-methyl-1-phenyl-3-phospholine-1-oxide, 1-ethyl-3-phospholine-1-oxide, 1,3-dimethyl-3-phospholine-1-oxide, 3-chloro-1-phenyl-3-phospholine-1-oxide, 3-(4-methyl-3-pentenyl)-1-phenyl-3-phospholine-1-oxide, and 1,3-diphenyl-3-phospholine-1-oxide. For purposes of this invention, 1,3-dimethyl-3-phospholine-1-oxide is preferred. These phospholine oxides are described in U.S. 2,663,737.

The phospholidines which may be used as catalysts are compounds having the formula

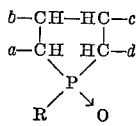

wherein $a$, $b$, $c$, $d$ and R have the significance defined above with the understanding that the R phenyl radicals may contain inert substituents. Representative examples of phospholidine-1-oxides that may be used include 1-phenylphospholidine-1-oxide, 1-ethyl-3-methylphospholidine-1-oxide, and 1,3-dimethylphospholidine-1-oxide. These phospholidines are described in U.S. 2,663,739.

The phosphonate esters which may be used as catalysts correspond to the formula

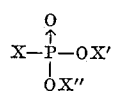

wherein X, X' and X" have the significance defined above. Representative examples of phosphonate esters that may be used in accordance with this invention are dimethyl methylphosphonate, diethyl methylphosphonate, diethyl ethylphosphonate, bis(2-bromoethyl) ethylphosphonate, bis(2-chloroethyl) 2-chloroethylphosphonate, diethyl allylphosphonate, bis(2-chloroethyl) vinylphosphonate, dibutyl n-amylphosphonate, and dibutyl 1-decanephosphonate.

The following examples will better illustrate the nature of the present invention; however, the invention is not intended to be limited to these examples. Parts are by weight unless otherwise indicated.

EXAMPLE 1

(A) Into a 440-ml. steel autoclave is charged a mixture containing 66.6 g. (0.673 mole) of freshly distilled n-butyl isocyanate, 315 g. (4.15 mole) of carbon disulfide (reagent grade) and 8 drops (0.2 g.) of 1,3-dimethyl-3-phospholine-1-oxide. The autoclave is agitated for 2 hours at 250° C. After cooling to room temperature, the autoclave is discharged, and the reaction product is concentrated in vacuo. Distillation of the residue through a 12″ Vigreux column yields 70.0 g. (91% of theory) of n-butyl isothiocyanate, B.P. 75–80° C. at 25–35 mm. Hg.

(B) Essentially the same results are obtained when one of the following catalysts is used instead of 1,3-dimethyl-3-phospholine-1-oxide in the process described under (A) above: 3-methyl-1-phenyl-3-phospholine-1-oxide, 3-methyl-1-ethyl-3-phospholine-1-oxide, 3-(4-methyl-3-pentenyl)-1-phenyl-3-phospholine-1-oxide, 1,3-diphenyl-3-phospholine-1-oxide, 1-phenyl-3-phospholine-1-oxide, 1-ethyl-3-methylphospholidine-1-oxide.

EXAMPLE 2

(A) Into a 440-ml. steel autoclave is charged a mixture containing 60.5 g. (0.509 mole) of phenyl isocyanate, 328 g. (4.32 moles) of carbon disulfide (reagent grade) and 8 drops (0.2 g.) of 1,3-dimethyl-3-phospholine-1-oxide. The autoclave is agitated for 2 hours at 250° C. After cooling to room temperature, the autoclave is discharged, and the reaction mixture is concentrated in vacuo. Distillation of the residue through a 12″ Vigreux column affords 62.6 g. (91% of theory) of phenyl isothiocyanate of B.P. 62–65° C. at 2.0–2.5 mm. Hg.

(B) When a similar experiment is carried out except that the autoclave is agitated for 12 hours at 150° C., the phenyl isothiocyanate is obtained in a 19% yield.

EXAMPLE 3

Into a 440-ml. steel autoclave is charged a mixture containing 44.8 g. (0.265 mole) of hexamethylene diisocyanate, 315 g. (4.15 moles) of carbon disulfide, and 8 drops (0.2 g.) of 1,3-dimethyl-3-phospholine-1-oxide. The autoclave is agitated for 2 hours at 250° C. After cooling to room temperature, the autoclave is discharged and the reaction product is concentrated in vacuo. The residue, weighing 45.6 g., is distilled through a 30″ spinning band column. The only product is 28.7 g. (54% of theory) of hexamethylene diisothiocyanate which distills as a yellow-orange oil, B.P. 150–151° C./1.3 mm., $n_D^{24}$ 1.5680. The pot residue consists of a black semi-solid mass.

EXAMPLE 4

Into a 440-ml. steel autoclave is charged a mixture containing 73.2 g. (0.42 mole) of 2,4-tolylene diisocyanate, 285 g. (3.74 moles) of carbon disulfide (reagent grade), and 10 drops (0.25 g.) of 1,3-dimethyl-3-phospholine-1-oxide. The autoclave is agitated for 2 hours at 250° C. After cooling to room temperature, the autoclave is discharged, and the reaction product is concentrated in vacuo. Distillation of the residue through a 30″ spinning band column affords 1.2 g. of a yellow liquid having a boiling point of 95–130° C. at 1.0 mm. Hg followed by 82.5 g. (95% of theory) of colorless 2,4-tolylene diisothiocyanate having a boiling point of 131–132° C. at 1.0 mm. Hg and a melting point of 53–55° C.

EXAMPLE 5

Using a procedure similar to that of Examples 1-4 above the following preparations are made:

*Starting Materials*

| Isocyanate | | | CS₂ | | Catalyst 1,3-dimethyl-3-phospholine-1-oxide | | Yield of corresponding isothiocyanate, percent of theory |
|---|---|---|---|---|---|---|---|
| | G. | Moles | G. | Moles | G. | Milli-Moles | |
| A. p-tolyl___ | 50.7 | 0.381 | 328 | 4.32 | 0.2 | 1.54 | 91 |
| B. m-tolyl__ | 60.0 | 0.451 | 252 | 3.32 | 0.2 | 1.54 | 95 |
| C. o-tolyl___ | 54.2 | 0.408 | 328 | 4.32 | 0.2 | 1.54 | 87 |
| D. p-chlorophenyl___ | 25.0 | 0.163 | 315 | 4.15 | 0.2 | 1.54 | 92 |
| E. o-methoxyphenyl__ | 61.0 | 0.409 | 315 | 4.15 | 0.2 | 1.54 | 96 |
| F. 2,6-tolylene di-_____ | 51.5 | 0.296 | 328 | 4.32 | 0.2 | 1.54 | 90 |
| G. p-phenylene di-_____ | 60.6 | 0.379 | 328 | 4.32 | 0.2 | 1.54 | 98 (crude) |

All preparations are carried out at 250° for 2 hours. All samples are isolated by concentrations followed by distillation except p-phenylene diisothiocyanate, from which the excess carbon disulfide is merely evaporated.

EXAMPLE 6

A mixture of 93.0 g. (0.78 mole) of phenyl isocyanate, 82.0 g. (1.08 moles) of carbon disulfide, and 2 drops (0.050 g.) of 1,3-dimethyl-3-phospholine-1-oxide is charged into a 440-ml. steel autoclave. The autoclave is agitated at 300° C. for 1 hour. Fractionation of the product through a spinning band column affords 96.0 g. (91% of theory) of phenyl isothiocyanate, B.P. 71-72° C./3.0 mm. Hg.

EXAMPLE 7

Into a 440-ml. steel autoclave is charged a mixture containing 55.2 g. (0.317 mole) of 2,4-tolylene diisocyanate, 315 g. (4.15 moles) of carbon disulfide (reagent grade) and 1.2 g. of bis(2-chloroethyl) 2-chloroethylphosphonate

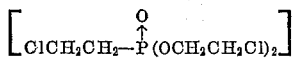

The autoclave is agitated for 12 hours at 250° C. After cooling to room temperature the autoclave is discharged, and the reaction product is concentrated in vacuo. Distillation of the residue through a 12″ Vigreux column affords as the only product 51.2 g. (79% of theory) of 2,4-tolylene diisothiocyanate, B.P. 145-147° C./1.5 mm.

EXAMPLE 8

A. Into a 440-ml. steel autoclave is charged a mixture containing 52.7 g. (0.303 mole) of 2,4-tolylene diisocyanate, 315 g. (4.15 moles) of carbon disulfide, and 8 drops (0.2 g.) of bis(2-chloroethyl) vinylphosphonate

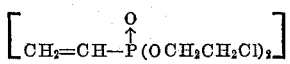

The autoclave is agitated for 8 hours at 250° C. After cooling to room temperature the autoclave is discharged, and the reaction product is concentrated in vacuo. Distillation of the residue through a 12″ Vigreux column affords as the only product 51.2 g. (83% of theory) of 2,4-tolylene diisothiocyanate.

B. Essentially the same results are obtained when one of the following catalysts is used instead of bis(2-chloroethyl) vinylphosphonate: dimethyl methylphosphonate, dipropyl methylphosphonate, di-n-butyl n-amylphosphonate, diethyl allylphosphonate.

As many widely different embodiments of this invention may be made without departing from the spirit and scope thereof, it is to be understood that this invention is not limited to the specific embodiments thereof except as defined in the appended claims.

What is claimed is:

1. A process for preparing an organic isothiocyanate which comprises heating an organic isocyanate having no active hydrogen-containing substituents which are reactive with an isocyanato group and at least one molecule of carbon disulfide for each isocyanato group at a temperature of about 100 to 400° C. in the presence of from about 0.01 to 10.0 parts by weight of a phosphorus compound per 100 parts by weight of said isocyanate compound, said phosphorus compound being selected from the group consisting of a substituted phospholine having the formula

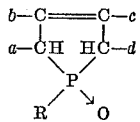

a substituted phospholidine having the formula

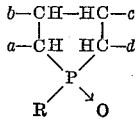

and a phosphonate ester having the formula

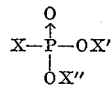

wherein $a$, $b$, $c$ and $d$ represent a radical selected from the group consisting of hydrogen, chlorine, bromine, lower alkyl, lower alkenyl, phenyl, cyclohexyl radicals, and polymethylene groups which, together with two adjacent carbon atoms in the heterocyclic ring, form a cycloaliphatic ring; R is a radical selected from the group consisting of lower alkyl and a phenyl radical; and X, X′ and X″ are radicals containing from one to 12 carbon atoms selected from the group consisting of alkyl, alkenyl and halogen-substituted alkyl radicals wherein the halogen is selected from the group consisting of chlorine and bromine.

2. A process according to claim 1 wherein the phosphorus compound is 1,3-dimethyl-3-phospholine-1- oxide.

3. A process according to claim 1 wherein the phosphorus compound is bis(2-chloroethyl) 2-chloroethylphosphonate.

4. A process according to claim 1 wherein the phosphorus compound is bis(2-chloroethyl) vinylphosphonate.

5. A process according to claim 2 wherein the organic isocyanate is phenyl isocyanate.

6. A process according to claim 2 wherein the organic isocyanate is 2,4-tolylene diisocyanate.

7. A process according to claim 2 wherein the organic isocyanate is 2,6-tolylene diisocyanate.

8. A process according to claim 2 wherein the organic isocyanate is a mixture of 2,4- and 2,6-tolylene diisocyanates.

9. A process according to claim 2 wherein the organic isocyanate is hexamethylene diisocyanate.

References Cited in the file of this patent

UNITED STATES PATENTS 2,681,358    Wirth _____ June 15, 1954
2,894,013    Werres _____ July 7, 1959